United States Patent [19]
Eriksson et al.

[11] Patent Number: 5,399,974
[45] Date of Patent: Mar. 21, 1995

[54] FAULT CURRENT FILTER

[75] Inventors: Leif Eriksson, Sala; Murari M. Saha, Västerås, both of Sweden

[73] Assignee: Asea Brown Boveri AB, Västerås, Sweden

[21] Appl. No.: 75,895

[22] Filed: Jun. 14, 1993

[30] Foreign Application Priority Data

Jun. 26, 1992 [SE] Sweden ................ 9201972

[51] Int. Cl.⁶ ............................................ G01R 31/08
[52] U.S. Cl. .................................. 324/521; 324/509; 324/522; 324/543
[58] Field of Search ............... 324/509, 521, 522, 543, 324/544, 551

[56] References Cited

U.S. PATENT DOCUMENTS

| | | | |
|---|---|---|---|
| 4,176,312 | 11/1979 | Wrinn | 324/521 X |
| 4,851,782 | 7/1989 | Jeerings et al. | 324/520 |
| 4,985,843 | 1/1991 | Kotani | 324/522 X |

OTHER PUBLICATIONS

Microprocessor-Implemented Digital Filters for the Calculation of Symmetrical Components, Degens, IEE Proc., vol. 129, Pt. C, No. 3, May 1982; pp. 111-118.
An Accurate Fault Locator with Compensation for Apparent Reactance in the Fault Resistance Resulting from RemoteEnd Infeed, Saha et al.; IEEE Transactions on Power Apparatus vol. PAS-104, No. 2; Feb., 1985; pp. 424-436.
Accurate Fault Impedance Locating Algorithm; Wiszniewski; IEEE Proc., vol. 130, Pt. C, No. 6, Nov. 1983, pp. 311-314.

*Primary Examiner*—Kenneth A. Wieder
*Assistant Examiner*—Glenn W. Brown
*Attorney, Agent, or Firm*—Watson, Cole, Grindle & Watson

[57] ABSTRACT

A method and a device for determining the fault current which occurs in case of a fault through a short circuit between phases or from phase/phases to ground. A measure of the fault current can be obtained by a linear combination of the sum of measured current samples for each phase at two adjacent points in time and in which each of these sample values is multiplied by a coefficient which is chosen such that the fault current gets into phase with the positive- and negative-sequence current changes.

4 Claims, 1 Drawing Sheet

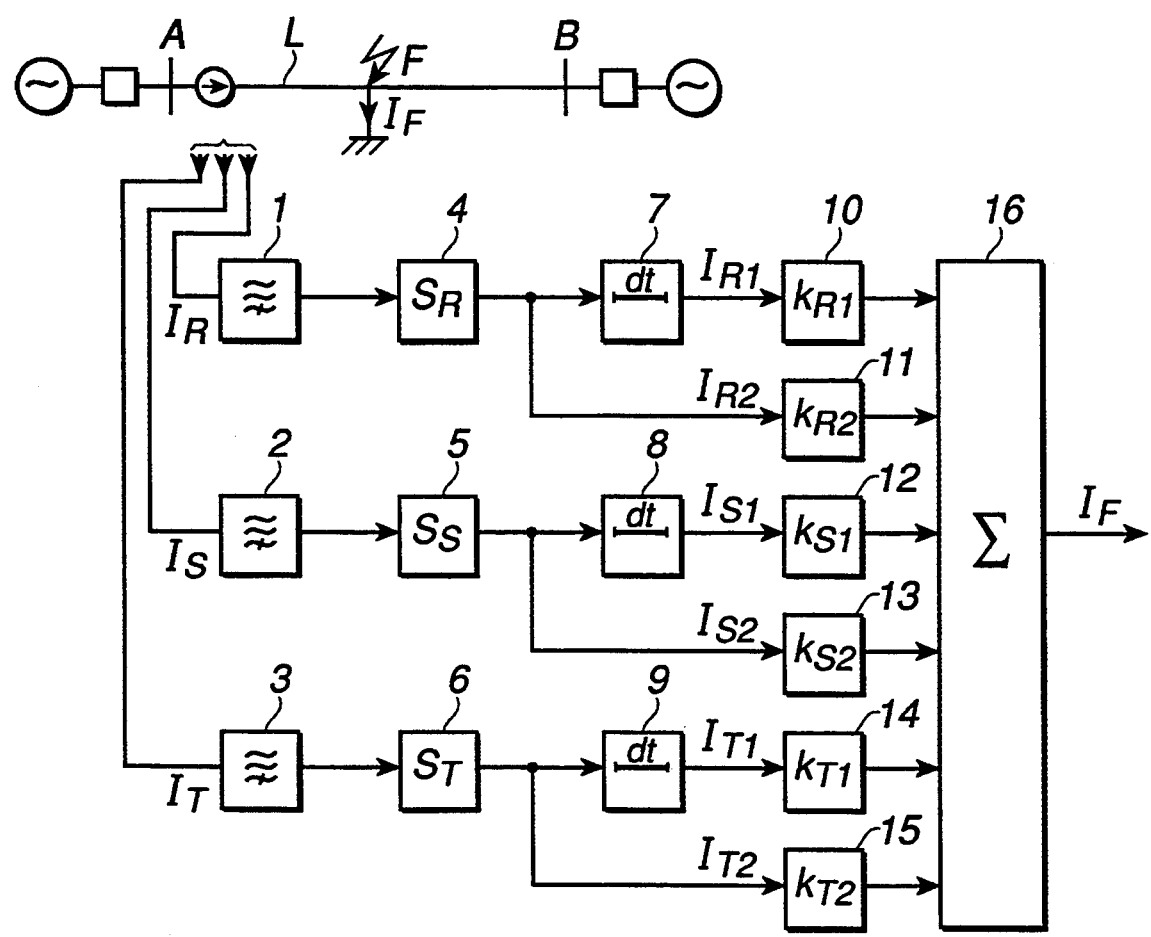

FAULT CURRENT FILTER

TECHNICAL FIELD

To be able to utilize in an efficient manner the protective relay algorithms which are available with today's techniques, for example for determining the distance from a measuring station to a fault on a transmission line or in distance protections, etc., a relatively fast determination of the fault current which occurs because of the fault is required. The present invention relates to a method and apparatus for very fast determination of a fault current and to a device in the form of a fault current filter which can determine, at a short building-up time, the fault current which occurs upon a fault through a short circuit between phases or from phase/phases to ground.

BACKGROUND ART, THE PROBLEM

Most fault locators are based on measurement of the reactance between a short circuit and that end of the transmission line where the fault locator is placed. The accuracy in the distance determination is, however, influenced by the fault resistance. The reason for this is that the current which flows through the fault resistance is somewhat offset in phase relative to the phase position of the current measured at the end of the transmission line, inter alia due to the current of the transmission line, before the occurrence of the fault. This means that the fault resistance is recognized as an apparent impedance with one resistive and one reactive component. It is this reactive component which gives rise to the inaccuracy of the fault in the distance determination since it influences the measured reactance.

A number of different ways of compensating for or reducing the influence of the phase difference during the fault distance determination have been described. Characteristic of most methods is that they try in some way to determine the fault current as accurately as possible. One method is described in an article in IEE Proc. Vol. 130, Pt. C, No. 6, November 1983, pp. 311-314, "Accurate fault impedance locating algorithm" by A. Wiszniewski. To sum up, this method means that the fault current is determined by summing up the phase currents, which means that the fault current is assumed to be equal to the unbalanced current in the ground conductor. Correction of the fault in the distance determination according to the article is further based on an estimation of the phase difference between the total current in the transmission line after the occurrence of a fault and the current through the fault resistance. The disadvantage of this method is that the unbalanced current is not always a good measure of the current flowing at the fault point owing to the fact that the fault current distribution for the zero-sequence current, that is, the distribution factor $D_{A0}$ is less reliable than the distribution factor for the positive-sequence current $D_A$. In addition, a large part of the zero-sequence current can often be shunted away in transformers connected to the object to be protected.

Another method is described in an article "An accurate fault locator with compensation for apparent reactance in the fault resistance resulting from remote-end infeed", published in IEEE Transaction on PAS, Vol. PAS-104, No. 2, Feb. 1984, pp 424-436. Besides taking into consideration the impedance $Z_1$ of the transmission line, this fault locator also takes into consideration the source impedances of the transmission line to be able correctly to describe the network and the influence of the supply to the fault current of current from both directions with the aid of the distribution factor $D_A$. According to this method, sampled phase currents, measured at a measuring station A at one end of the line, are memorized to be able to determine the change in the currents at the measuring station which arises when a fault occurs, that is, the current change $I_{FA}$ equal to the actual load and fault current $I_A$ minus the load current before the occurrence of the fault. The voltage $U_A$ at the measuring station A can thereby be expressed as the sum of the voltage drop $I_A \cdot p \cdot Z_l$ across that part of the line which is located between the measuring station and the fault point plus the fault voltage $I_F \cdot R_F$ where $I_F$ is the current which flows through the fault resistance $R_F$, that is, $$U_A = I_A \cdot p \cdot Z_l + I_F \cdot R_F \tag{1}$$

where "p" is the relative distance to the fault.

Because the current $I_F$ which flows through the fault resistance has a current contribution also from a supply station at the other end of the transmission line, $I_F$ will be different from $I_{FA}$. The relationship between these is determined by the above-mentioned distribution factor as follows $$I_{FA} = D_A \cdot I_F \tag{2}$$

Further, without going into detail, it can be demonstrated that $$I_{FA} = 3/2(\Delta I_A - I_{0A}) \tag{3}$$

where $\Delta I_A$ is the sum of changes in the symmetrical current components measured at A and $I_{0A}$ is the zero-sequence component which occurs in the even of a fault. In addition, since $$\Delta I_A - I_{0A} = \Delta I_{1A} + \Delta I_{2A} \tag{4}$$

this means that the current change—measured at A—which occurs upon a fault can be expressed with the aid of the sum of changes in the positive- and negative-sequence currents at the measuring point A. With knowledge of the value of these currents, $I_{FA}$ can be determined, and since also $D_A$ is known for the network in question, $I_F$ can be determined as follows $$I_F = I_{FA}/D_A = 3/2(\Delta I_{1A} + \Delta I_{2A})/D_A \tag{5}$$

This is normally expressed in such a way that as fault current there is used the zero-sequence-free part of the current change which occurs in the event of a fault. The method for solution means that equation (1) can now be written as $$U_A = I_A \cdot p \cdot Z_l + (I_{FA}/D_A) \cdot R_F \tag{1a}$$

which leads to a quadratic equation for solution of "p".

The reason for using as a measure of the fault current the zero-sequence-free part of the current changes is that the zero-sequence impedances of the network have a lower angle and are less reliable than the positive-sequence impedances. The corresponding distribution factor thus becomes less reliable and hence also the phase angle between actual and measured fault currents becomes less reliable.

The described method of obtaining the fault current, however, is no method that can be used when high demands are placed on fast protective functions. The reasons for this are, inter alia, that currents both before and after a fault has occurred are Fourier filtered to obtain the fundamental components of the currents and that the method of calculation for solving "p" is relatively extensive.

Another way of obtaining a measure of the fault current is described in an article entitled "Microprocessor-implemented digital filters for the calculation of symmetrical components" by A. J. Degens, published in IEE Proc., Vol. 129, Pt. C, No. 3, pp. 111-118, May 1982. However, this method for determining the fault current requires that the sampling frequency is a multiple of the network frequency and that a number of older samples are memorized. This means that a considerable amount of time passes before the filter for obtaining the fault current has become adapted to the new conditions after a fault has occurred on the power network.

SUMMARY OF THE INVENTION

A method according to the invention for determining, in a very fast manner, the fault current which occurs in a power network when a fault has occurred is based on the zero-sequence-free part of the current change which takes place in connection with the fault. The method for evaluation of the fault current $I_F$ is based on the sum $I_{FA1,2}$ of the changes in the positive- and negative-sequence components at the measuring station A but takes place in a manner which considerably differs from that described under the background art above. It is here assumed that $I_F$ is equal to a linear combination of the sum of measured current samples for each phase at two adjacent points in time, $t_1$ and $t_2$, and where each of these sample values is multiplied by a coefficient which is chosen in such a way that the fault current gets into phase with the positive- and negative-sequence changes. Thus, the fault current equation for $I_F$ will have the following form:

$$I_F = k_{R1} \cdot I_{R1} + k_{R2} \cdot I_{R2} + k_{S1} \cdot I_{S1} + k_{S2} \cdot I_{S2} + k_{T1} \cdot I_{T1} + k_{T2} \cdot I_{T2}$$

where $I_{R1}$, $I_{S1}$ and $I_{T1}$ are simultaneous current sample values in the R-, S- and T-phases at the time $t_1$ and the corresponding $I_{R2}$, $I_{S2}$ and $I_{T2}$ are simultaneous current sample values at the time $t_2$. An example of this assumption is clear from the following.

According to the above equation (5), the fault current can be written as $$I_F = I_{FA}/D_A = 3/2 \, (\Delta I_{1A} + \Delta I_{2A})/D_A \quad (5)$$

According to known technique, the positive- and negative sequence currents can also be expressed with the aid of the phase currents, and by insertion of these known expressions the fault current can be written as $$I_F = 3/2(\tfrac{2}{3}/D_A I_R + (1/D_A/(a-a^2) - \tfrac{1}{3}/D_A)I_S + (-1/D_A/(a-a^2) - \tfrac{1}{3}/D_A)I_T)$$

where $a = 1 \cdot \exp(j2\pi/3)$, that is, the unit vector with the argument 120°.

This expression shows generally that the fault current can be obtained by adding the phase currents after first having phase-shifted them.

There are several alternative ways of obtaining the coefficients $k_{R1}$, $k_{R2}$, $k_{S1}$ and so on. To show one method, it will be described how the coefficients $k_{R1}$ and $k_{R2}$, that is, the coefficients by which the samples $I_{R1}$ and $I_{R2}$ at times $t_1$ and $t_2$ are to be multiplied, can be determined. The starting-point is the following trigonometric relationship:

$$I_{R1} = \sin \omega t_1 = \sin \omega(t_2 - dt)$$

where "dt" corresponds to the difference in time between the samples and $\omega dt$ the angular difference, $$I_{R2} = \sin \omega t_2$$

The above criterion, that is, that the coefficient should be chosen in such a way that the phase position of the output signal of the filter shall correspond to the phase position of the fault current, can be transferred into determining a sample value $I_{R3}$ at the time $t_2$ of a sinusoidal current with the same amplitude as, in this example, the current of the R-phase with a phase-shifted angle $\beta_R$ relative to the R-phase, that is, $$I_{R3} = \sin(\omega t_2 - \beta_R)$$

The angle $\beta_R$ can be determined on the basis of the network in question and the distribution factor $D_A$ in case of a fault at the end of the line.

With the aid of trigonometric calculations, $I_{R3}$ as a function of dt and $\beta_R$ can be determined to be $$I_{R3} = (\sin \beta_R/\sin \omega dt)I_{R1} + (\cos \beta_R - (\cos \omega dt \cdot \sin \beta_R) \sin \omega dt)I_{R2} = k_{R1}I_{R1} + k_{R2}I_{R2}$$

In a corresponding way, the coefficients of the current samples for the S- and T-phases can be determined. From a purely general point of view, the coefficients are in this way dependent on the distribution factor $D_A$ and the angle $\omega dt$ between two consecutive samples, that is, that $$k_{X1,2} = f(D_A, \omega dt)$$

where X stands for R, S and T.

BRIEF DESCRIPTION OF THE DRAWING

The sole FIGURE represents an embodiment of the best mode of carrying out a fault determining filter of the invention.

DESCRIPTION OF THE PREFERRED EMBODIMENTS

The invention comprises a device in the form of a fault current filter for determining the fault current which arises upon a short circuit between transmission lines and ground, and will be clear from the accompanying FIGURE. A transmission line L is supplied via the stations A and B. At F, a ground fault has occurred, whereby a fault current $I_F$ to ground arises, which is supplied from both stations. The impedance of the line and the source impedances are known, whereby the distribution factor $D_A$ is known. In station A the three phase currents $I_R$, $I_S$ and $I_T$ are measured in a conventional way. The measured values are each supplied to a respective low-pass filter 1, 2 and 3 and thereafter to the sampling members 4, 5 and 6 for the respective phase. Via time lag members 7, 8 and 9 with the time lag "dt", corresponding to the time between each sample, a continuous and consecutive access to two sample values is provided, measured with the time difference "dt" for each phase. As is also clear from the foregoing description, sample values are designated $I_{R1}$ and $I_{R2}$ for the R-phase, $I_{S1}$ and $I_{S2}$ for the S-phase, and $I_{T1}$ and $I_{T2}$ for the T-phase.

With knowledge of the distribution factor $D_A$ for the network in question and the time "dt" between each sample, the coefficients $k_{R1}$, $k_{R2}$, $k_{S1}$, $k_{S2}$, $k_{T1}$ and $k_{T2}$ according to the fault current equation $$I_F = k_{R1} \cdot I_{R1} + k_{R2} \cdot I_{R2} + k_{S1} \cdot I_{S1} + k_{S2} \cdot I_{S2} + k_{T1} \cdot I_{T1} + k_{T2} \cdot I_{T2}$$

can be determined, for example as described under the summary of the invention above. By allowing the sample values, via the coefficient units 10, 11, 12, 13, 14, 15, to be multiplied by the respective coefficient and allowing the products to be supplied to a summator 16 for summing up these according to the fault current equation, a measure of the fault current $I_F$ in question is obtained.

From the point of view of construction, the fault current filter can be designed in several different, more or less integrated, ways. It may consist of individual functional units, as is immediately clear from the accompanying FIGURE, or some of or all of the units may be formed as an integrated circuit or be implemented in a computer.

We claim:

1. A method for determining the fault current $I_F$ resulting from a fault on a multi-phase transmission line upon a short circuit between at least one of the phases of said multi-phase transmission line and ground, comprising the steps of:

measuring the respective phase currents;

low-pass filtering the respective measured phase currents;

sampling the respective filtered phase currents;

multiplying two continuously and consecutively measured sampled phase currents for each phase, namely $I_{R1}$, $I_{R2}$, $I_{S1}$, $I_{S2}$, $I_{T1}$, $I_{T2}$, by a predetermined coefficient $k_{R1}$, $K_{R2}$, $k_{S1}$, $k_{S2}$, $k_{T1}$, $k_{T2}$, which are selected so that the fault current is brought into phase with the positive-sequence and negative-sequence components of the measured phase currents; and obtaining the fault current by forming the sum $I_F = k_{R1} \cdot I_{R1} + K_{R2} \cdot I_{R2} + k_{S1} \cdot I_{S1} + k_{S2} \cdot I_{S2} + k_{T1} \cdot I_{T1} + k_{T2} \cdot I_{T2}$.

2. A method according to claim 1, further comprising the step of determining said predetermined coefficients based on the distribution factor $D_A$ of the power network and the angular difference $\omega dt$ between two consecutive measured phase current samples so that the phase position of $I_F$ corresponds to the phase position of the fault current.

3. Apparatus for determining the fault current $I_F$ resulting from a fault caused by a short circuit on a multi-phase transmission line between at least one phase of said multi-phase transmission line and ground, comprising:

means for measuring the phase currents;

means for low-pass filtering the measured phase currents;

means for continuously and consecutively providing sampled measured values $I_{R2}$, $I_{S2}$, $I_{T2}$ of the low pass filtered phase currents;

means for time-delaying sampled measured current values $I_{R1}$, $I_{S1}$, $I_{T1}$ at least one sampling interval earlier than said sampled measured current values;

means for multiplying both the sampled measured values and the time-delayed sampled current values by respective coefficients $k_{R1}$, $K_{R2}$, $k_{S1}$, $k_{S2}$, $k_{T1}$, $k_{T2}$, which are selected so that the fault current is brought into phase with the positive-sequence and negative-sequence components of the measured phase currents to generate the product of the respective coefficients and the sampled measured values and the time-delayed sampled current values; and means for summing said product to obtain a signal corresponding to the fault current $I_F = k_{R1} \cdot I_{R1} + K_{R2} \cdot I_{R2} + k_{S1} \cdot I_{S1} + k_{S2} \cdot I_{S2} + k_{T1} \cdot I_{T1} + k_{T2} \cdot I_{T2}$.

4. Apparatus for determining the fault current according to claim 3, further comprising means for determining said predetermined coefficients based on the distribution factor $D_A$ of the power network and the angular difference $\omega dt$ between two consecutive measured phase current samples so that the phase position of $I_F$ corresponds to the phase position of the fault current.

* * * * *